United States Patent [19]

Takahashi

[11] Patent Number: 5,477,299
[45] Date of Patent: Dec. 19, 1995

[54] PHOTOGRAPHIC FILM CASSETTE WITH A MOVEABLE CLOSING STRUCTURE, CAMERA FOR USE THEREWITH, AND METHOD OF MANUFACTURING THE CASSETTE

[75] Inventor: Koichi Takahashi, Kanagawa, Japan

[73] Assignee: Fuji Photo Film Co., Ltd., Kanagawa, Japan

[21] Appl. No.: 83,285

[22] Filed: Jun. 29, 1993

[30] Foreign Application Priority Data

Jun. 29, 1992 [JP] Japan ................... 4-170951

[51] Int. Cl.⁶ ................................................ G03B 17/26
[52] U.S. Cl. .................................................... 354/275
[58] Field of Search ........................... 354/275; 242/71.1

[56] References Cited

U.S. PATENT DOCUMENTS

| | | | |
|---|---|---|---|
| 4,221,479 | 9/1980 | Harvey | 354/275 |
| 4,834,306 | 5/1989 | Robertson et al. | 354/275 |
| 4,848,693 | 7/1989 | Robertson | 354/275 X |
| 4,880,179 | 11/1989 | Beach | 354/275 X |
| 4,948,063 | 8/1990 | Niedospial, Jr. | 354/275 X |
| 4,980,713 | 12/1990 | Fujita et al. | 354/275 |
| 5,112,003 | 5/1992 | Covington et al. | 354/275 |
| 5,174,519 | 12/1992 | Oi et al. | 354/275 |
| 5,200,777 | 4/1993 | Zander . | |

FOREIGN PATENT DOCUMENTS 0091077 10/1983 European Pat. Off. .
0453864 10/1991 European Pat. Off. .

*Primary Examiner*—Michael L. Gellner
*Assistant Examiner*—Nicholas J. Tuccillo
*Attorney, Agent, or Firm*—Sughrue, Mion, Zinn, Macpeak & Seas

[57] ABSTRACT

A photographic film cassette has a cassette shell, a spool contained in the cassette shell, and photographic film wound on the spool in a form of a roll. A leader of the photographic film is exited from the cassette shell through a passage mouth when the spool is rotated in the unwinding direction. A passageway is formed between the passage mouth and a roll chamber and has first and second inside faces which face respectively the emulsion and back surfaces of the photographic film. A first pair of ridges are formed on the first inside face, and contact on the emulsion surface in an area outside of exposure-designated image areas relative to a width of the strip of the photographic film. A second pair of ridges are formed on the second inside face, and contact on the back surface in an area outside of exposure-designated image area relative to the strip width. The two pairs ridges regulate a tendency of the photographic film to curl. In a preferred embodiment, a photographic film receiving gate of a camera is provided with a pair of ridges and pair of steps for regulation of the curl.

23 Claims, 15 Drawing Sheets

PHOTOGRAPHIC FILM CASSETTE WITH A MOVEABLE CLOSING STRUCTURE, CAMERA FOR USE THEREWITH, AND METHOD OF MANUFACTURING THE CASSETTE

BACKGROUND OF THE INVENTION

1. Field of the Invention

The present invention relates to a photographic film cassette, a camera for use therewith, and a method of manufacturing the cassette. More particularly, the present invention relates to an improvement of a photographic film cassette, having a moveable closing structure, in which a leader of a photographic film can be advanced to the outside of a cassette shell when a spool is rotated in an unwinding direction, and a camera and a manufacture method associated with such a cassette.

2. Description of the Related Art

A known photographic film cassette includes a photographic film which is positioned so that a leader thereof does not protrude from the cassette shell prior to loading the cassette in a camera. A simple photographic film-transporting mechanism of the camera is typically used with this type of cassette, and includes a construction which rotates a spool to unwind a photographic film strip (hereinafter called as film), thereby causing the leader to move through a passageway formed in the cassette shell to an exterior of the cassette shell. Such a cassette is disclosed in U.S. Pat. Nos. 4,834,306 and 5,174,519. To prevent ambient light from entering the cassette shell, plush, or light-trapping ribbons, are conventionally attached to the inside of the passageway. U.S. Pat. No. 4,221,479 also discloses that a movable closing structure selectively encloses the inside of the cassette shell in a light-tight manner.

When a camera is loaded with the cassette, the closing structure is opened, by a mechanism in the camera, before the advancing mechanism incorporated in the camera rotates the spool in the unwinding direction to advance the leader. The closing structure is closed when the photographic film is wound back into the cassette shell after exposure of the photographic film is completed. Accordingly, the closing structure protects the exposed photographic film from being inadvertently subjected to ambient light. Use of the moveable closing structure instead of plush, is favorable, because less load is applied to the leader during advancement of the film. This facilitates the advancement of the film in response to rotation of the spool.

It is well known that the photographic film is constituted by applying photosensitive emulsion to one surface of a base, which is formed e.g. of cellulose triacetate (TAC). In the manufacturing process, the photographic film is dried after applying the coating of emulsion to the base. The photographic film shrinks, to degrees different between the emulsion surface and the back surface, during drying. In particular, as illustrated in FIG. 25, an emulsion surface 2a tends to shrink more than a back surface 2b, to cause a photographic film 2 to curl. When a spool 40a is rotated, a leader 2d of the photographic film 2 is exited through a passage mouth 5 from a cassette shell 40b, with a curled amount of W.

The photographic film cassette 40 in FIG. 25 incorporates a shutter member 194 as a moveable closing structure disposed at the passage mouth 5. Both surfaces 2a and 2b of the photographic film 2 come in direct contact with inside walls of the passage mouth 5 as the film 2 is advanced out of the cassette shell. The curling of the photographic film 2 causes the photographic film 2 to rub against the inside of the cassette shell 40b. Accordingly, the cassette shell 40b may damage the photographic film 2. Any scratches formed on the photographic film 2 are conspicuously enlarged on resulting photoprints. This lowers the quality of the photoprints.

SUMMARY OF THE INVENTION

In view of the foregoing problems, an object of the present invention is to provide a photographic film cassette, a camera for use therewith, and a method of manufacturing the cassette, in which scratching of the photographic film can be avoided.

Another object of the present invention is to provide a photographic film cassette, a camera for use therewith, and a method of manufacturing the cassette, in which a moveable closing structure can be easily formed.

In order to achieve the above and other objects and advantages of this invention, a passageway is formed between the passage mouth and the roll chamber of a cassette for allowing photographic film to pass therethrough. The passageway is defined between opposite first and second inside faces. The first inside face is in opposition to the emulsion surface of the photographic film. The second inside face is in opposition to the back surface of the photographic film. A first pair of projections are formed on the first inside face to contact with the emulsion surface in an area which is outside of exposure-designated image areas relative to a width of the photographic film. A second pair of projections are formed on the second inside face to contact with the back surface in an area outside of exposure-designated image areas relative to the width of the photographic film Interaction between the projections and the film regulates the tendency of the photographic film to curl in a width-wise direction.

Further, a shutter rod is arranged in the passageway for preventing ambient light from entering the roll chamber, and is rotatably supported between the first and second shell halves to be displaceable between closed and open positions in the passageway. A slot, formed through the shutter rod, has first and second opposite walls. When the shutter rod stands in the closed position, the walls block the passageway to shield ambient light. When the shutter rod stands in the open position, the slot is aligned with the passageway to allow the photographic film to pass therethrough. To produce the photographic film cassette, a single mold is used for forming the first wall of the slot having the first pair of projections.

The shutter member thus constructed can be formed with great ease, because no moveable parts are required in molding the shutter member other than the molds for the core side and the cavity side.

A camera for use with the cassette has a cassette chamber for containing the cassette shell. A rotating device is arranged in the cassette chamber for rotating the spool, which is rotated in the unwinding direction to cause the leader of the photographic film to exit the cassette shell through the passage mouth. A receiving gate is formed with the cassette chamber for receiving the photographic film exited from the passage mouth. The receiving gate has front and rear walls. A third pair of projections are formed on the front wall to contact with the photographic film in an area outside of exposure-designated image areas relative to the width of the photographic film. A fourth pair of projections are formed on the rear wall to contact with the photographic film in an area outside of exposure-designated areas relative to the width of the photographic film, in position inward from the third pair of projections relative to the width, to regulate a tendency of the photographic film to curl in the width-wise direction.

The invention allows protection of the photographic film from damage without a need to widen the range of a passageway in the direction of the thickness of the photographic film. Such an arrangement would be impractical and unfavorable, because it would enlarge the size of the photographic film cassette, and be incompatible with compact cameras. Also, in the invention, light can be prevented from entering the film chamber, through the passageway, without the need for light-trapping ribbons.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
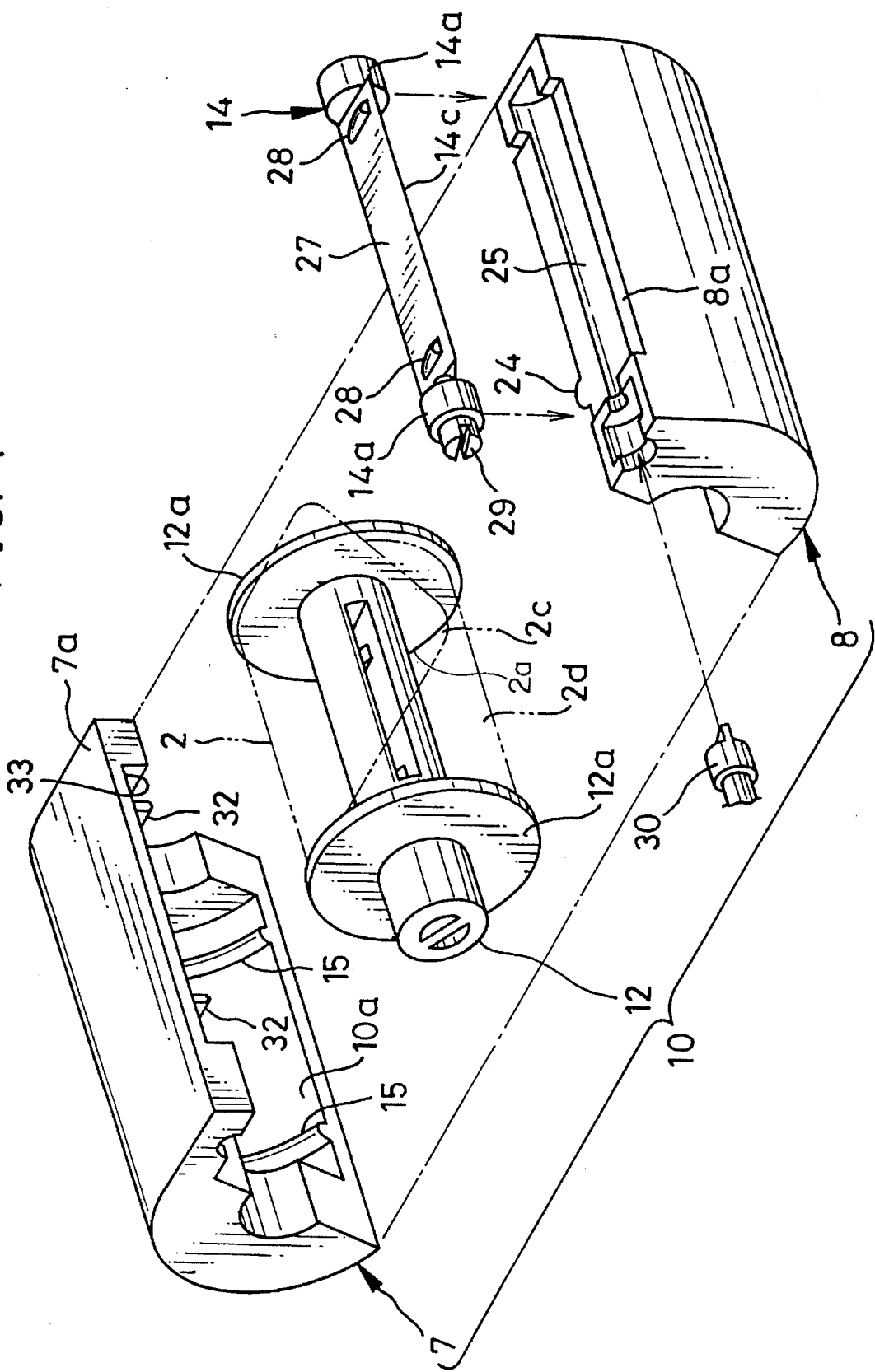
FIG. 1 is an exploded perspective view illustrating a photographic film cassette according to a preferred embodiment of the present invention.

FIG. 1 illustrates a photographic film cassette of a preferred embodiment. A cassette shell 10 consists of a pair of shell halves 7 and 8. A photographic film 2 is wound around a spool 12 which is disposed in the cassette shell 10. The relevant parts, other than the film 2, are made from resin.

Figure 2:
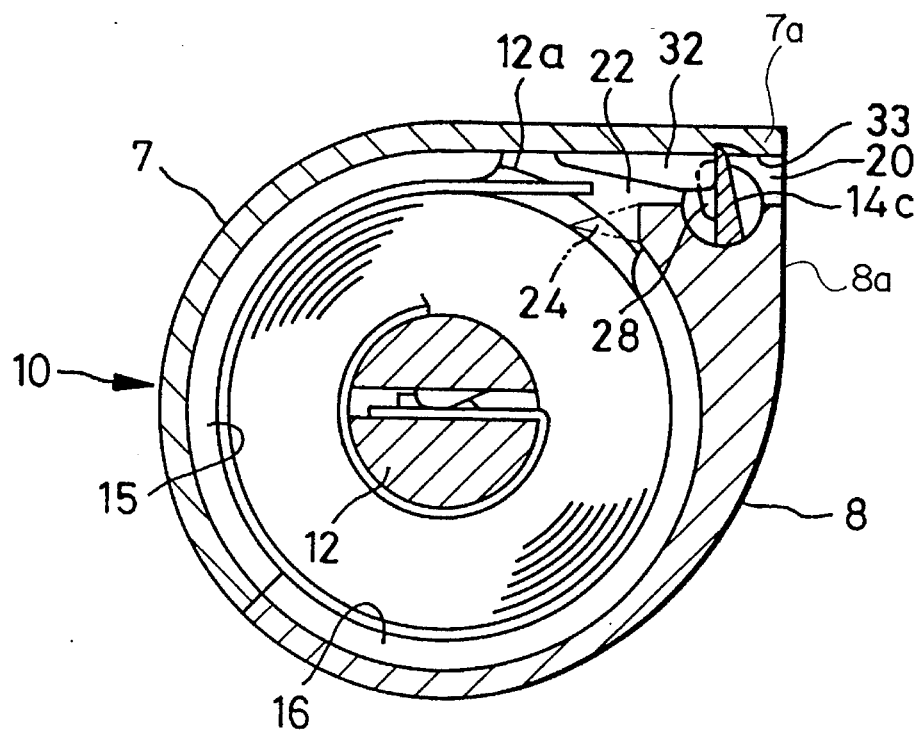
FIG. 2 is a sectional view illustrating the cassette in a state in which a shutter plate is closed.
Figure 3:
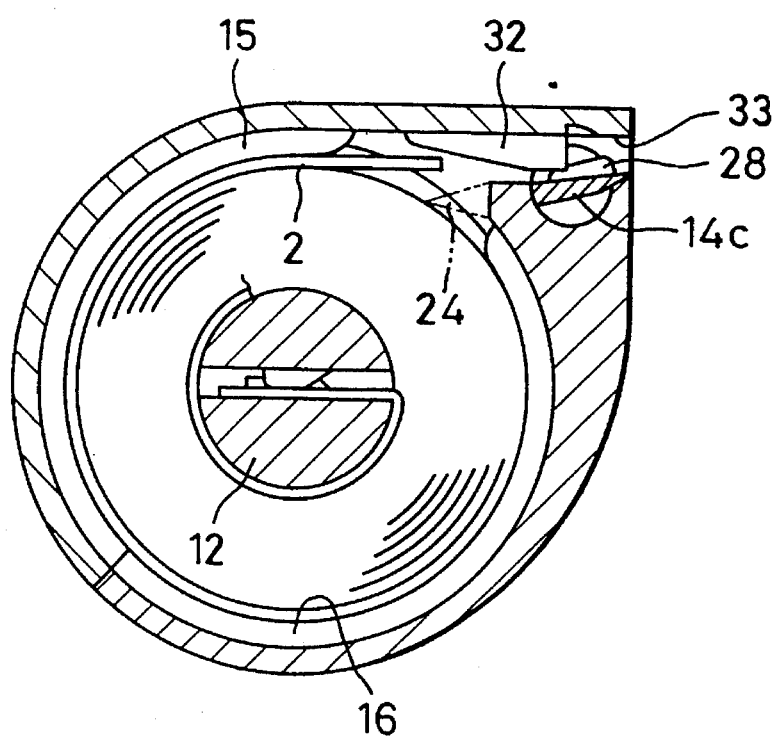
FIG. 3 is a sectional view illustrating the cassette in a state in which the shutter plate is opened.

The upper shell half 7 is provided with a pair of arcuate ridges 15 which extend into a roll chamber 10a defined in the cassette shell 10. The lower shell half 8 is provided with a pair of arcuate ridges 16, as illustrated in FIG. 2. While the cassette shell 10 contains the spool 12 with the photographic film 2, the ridges 15 and 16 are in contact with the outermost turns of a roll 2d of the photographic film 2 to prevent the photographic film 2 form loosening around the spool 12. Note that the ridges 15 and 16 are in contact with the photographic film 2 at positions which are outside of the picture frame image areas, to be created on the photographic film 2, in the width-wide direction of the photographic film 2. Thus images on the photographic film 2 will not be scratched due to contact with the ridges 15 and 16. Of course, any known structure can be utilized for preventing loosening of the roll 2d. For example, the flanges 12a of the spool 12 can have circumferential lips formed thereon.

Ports 7a and 8a are formed on the shell halves 7 and 8, respectively. A passageway 22 and a passage mouth 20 are defined between the ports 7a and 8a (see FIG. 2). A separator claw 24 is formed on the lower shell half 8 on the innermost portion of the port 8a. When the roll 2d of the photographic film 2 is rotated by rotation of the spool 12, the claw 24 separates a leader 2c of the photographic film 2 from the roll 2d. The photographic film 2 is wound between the flanges 12a of the spool 12 with an emulsion surface 2a of the photographic film 2 facing the core of the spool. A trailer of the photographic film 2 is retained or anchored on the spool 12 in a known manner.

The lower port 8a is provided with a semi-cylindrical recess 25 extending across the width-wise direction of the photographic film 2. A shutter plate 14 is inserted in the recess 25 in a rotatable manner. The shutter plate 14 is provided with a pair of shaft portions 14a, which are received in recesses formed in the lower port 8a and the upper port 7a, and a plate portion 14c extending between the shaft portions 14a. The shaft portions 14a are slidable with respect to the walls of the recesses. The shutter plate 14 is thus supported in the cassette shell 10 in a rotatable manner. The plate portion 14c has an inside face 27 which is directed to the inside of the cassette shell 10 when the shutter plate 14 is in a closed position. A pair of ridges 28 are formed on the inside face 27. The ridges 28 are inclined so that, when the shutter plate 14 is in an open position, their height increases toward the passage mouth 20 from the roll chamber 10a in order to smoothly guide the photographic film 2 toward the passage mouth 20. One distal end of the shutter plate 14 has a key slot 29, which is exposed, through an end face of the cassette shell 10, externally, when the film cassette is assembled. When the photographic film cassette is loaded in a camera, the key slot 29 can be rotated by an associated opener mechanism 30 incorporated in the camera.

As illustrated in FIG. 2, the upper port 7a has an inside face 33, on which a pair of ridges 32 are formed. The ridges 32 are inclined so that their height increases toward the passage mouth 20 from the roll chamber 10a in order to smoothly guide the photographic film toward the passage mouth 20. The arrangement of the ridges 28 and 32 is illustrated in detail in FIG. 4. Interval A between the ridges 28 is greater than Interval B between the ridges 32, namely A>B. Range S of the picture frame image areas to be recorded on the photographic film 2, is smaller than Interval B. Range S is determined by an exposure frame aperture of the camera for use with the novel cassette but is ordinary within standard ranges.

The operation of the novel cassette will be now described. Before use, as illustrated in FIG. 2, the leader 2c of the photographic film 2 is completely contained within the cassette shell 10. The shutter plate 14 is in a closed position, wherein the plate portion 14c closes the passageway 22. Note that, in the closed position, the shutter plate 14 may be engaged with steps or the like formed in the ports 7a and/or 8a, or may be biased toward the closed position with a spring, or the like.

Figure 4:
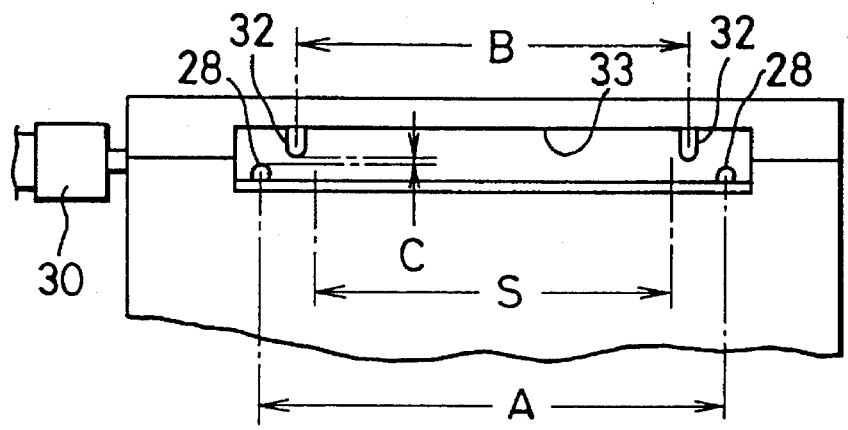
FIG. 4 is a plan view illustrating a passage mouth with the shutter plate open.

A camera is loaded with the cassette in this state. Upon closing a lid of the camera, the cassette opener 30 is engaged with the key slot 29 and rotates it clockwise in FIG. 1. The shutter plate 14 is thus rotated to an open position (wherein the plate portion 14c is not blocking the passageway 22) to open the passageway 22. In this state, the inside face 27 now defines the bottom of the passageway 22. As illustrated in FIG. 4, the ridges 28 on the face 27 are outside the ridges 32 on the face 33, with respect to the width of the cassette shell 10.

A motor in the camera for feeding the photographic film 2 is then driven, to rotate the spool 12 in the clockwise direction, in FIGS. 1 and 2. The photographic film 2 thus is rotated together with the spool 12. The leader 2c eventually abuts on, and is separated by, the separator claw 24, and is directed to the passageway 22. The outermost turn of the photographic film 2 contacts with the ridges 15 and 16, and is thus prevented from loosening. Accordingly, the leader 2c is advanced toward the passage mouth 20 in response to the rotation of the spool 12.

Figure 5:
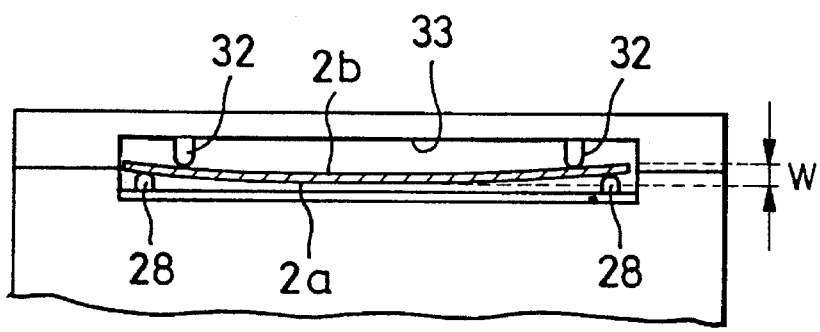
FIG. 5 is a plan view illustrating a passage mouth while photographic film is passed therethrough.
Figure 6:
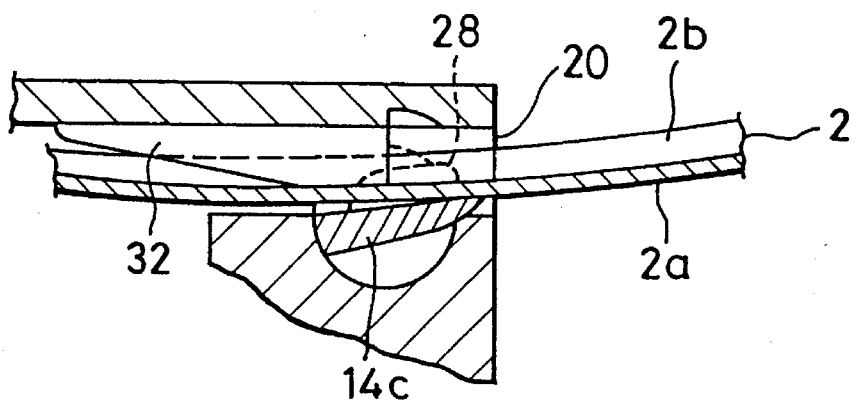
FIG. 6 is a partial view in cross section illustrating the cassette with the photographic film.

While the photographic film 2 is passed through the passageway 22, the emulsion surface 2a thereof is supported on the ridges 28. A back surface 2b of the photographic film 2 is pressed by the ridges 32. As illustrated in FIGS. 5 and 6, the photographic film 2 is effectively regulated to cause the emulsion surface 2a to be somewhat convex, i.e., the film 2a is curled in the direction opposite to the original characteristic of curling of the photographic film 2. The ridges 28 and 32 are in contact with the photographic film 2 outside of the ranges S where exposure is designated for creating image frames, and thus do not affect the image quality even if the ridges 28 and 32 scratch the surfaces 2a or 2b.

Therefore, the ridges 28 and 32 regulate the width-wise curling characteristic of the photographic film 2, to eliminate contact between the range S of the photographic film 2 and any portions of the cassette shell 10. Accordingly, even in the absence of elastic parts such as plush, the light-shielding structure of the preferred embodiment disclosed above, having the shutter plate 14, will never scratch exposure-designated image areas. It is possible to utilize plastics, or the like, for constructing parts of the novel cassette including the shutter plate 14 and the cassette shell 10.

EXAMPLE 1

Samples 1 to 3 of the novel cassette were produced for tests, while varying clearance C, as illustrated in FIG. 4, defined between the lower ridges 28 and the upper ridges 32 with respect to the direction of the thickness of the photographic film 2. The photographic film 2 in each of Samples 1 to 3 was advanced outward from the cassette. The magnitude of curl of the film 2 in the width-wise direction was observed, and the surfaces 2a and 2b were subsequently examined for scratches. The photographic film 2 was SHG film (trade name) manufactured by Fuji Photo Film Co., Ltd. and having an ISO of 100. It was observed that the photographic film 2, when in a free state, had such a curling characteristic that the width-wise middle of the photographic film 2 protruded from the lengthwise edges of the photographic film 2 to the amount W (see FIG. 5) equaling to 5.7 mm. The photographic film 2 was positioned through the passageway 22 of each of the Samples centrally with respect to the width-wise direction of the photographic film 2, and the curling of the photographic film 2 as it passed though the passageway 22 was measured, with the following results.

| Sample 1 | Clearance C (in mm) | Arch-Curled Amount (in mm) |
|---|---|---|
| Sample 1 | 0.25 | 0.5 |
| Sample 2 | 0.15 | 0.4 |
| Sample 3 | 0.0 | 0.3 |

As can be observed from the table above, the ridges 28 and 32 clearly regulated the width-wise curling characteristic of the photographic film 2. Note that Sample 3 was compared to a Comparative Example lacking the ridges 28 and 32 but otherwise similar to Sample 3. It was observed that the number of scratches as created on the film 2 with Sample 3 was less than one fifth as many as the number of scratches as created by the Comparative Example. The scratches created on the film 2 with Sample 3 were also shallower than those created by the Comparative Example.

Figure 7:
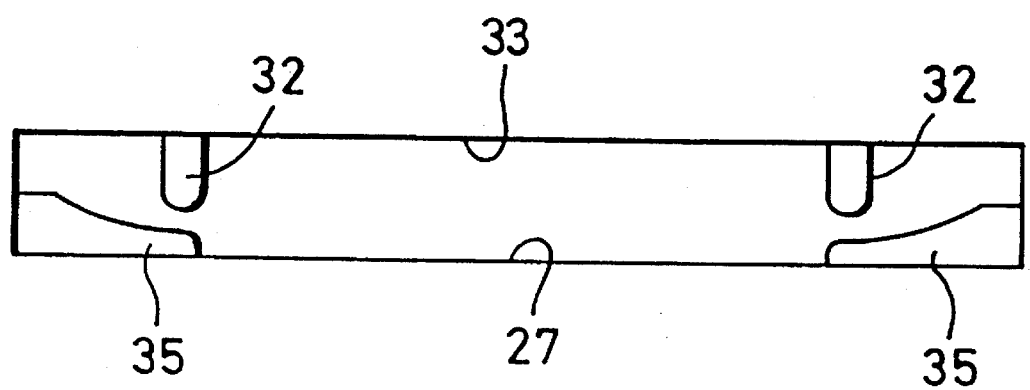
FIGS. 7 and 8 are plan views illustrating other preferred embodiments.
Figure 8:
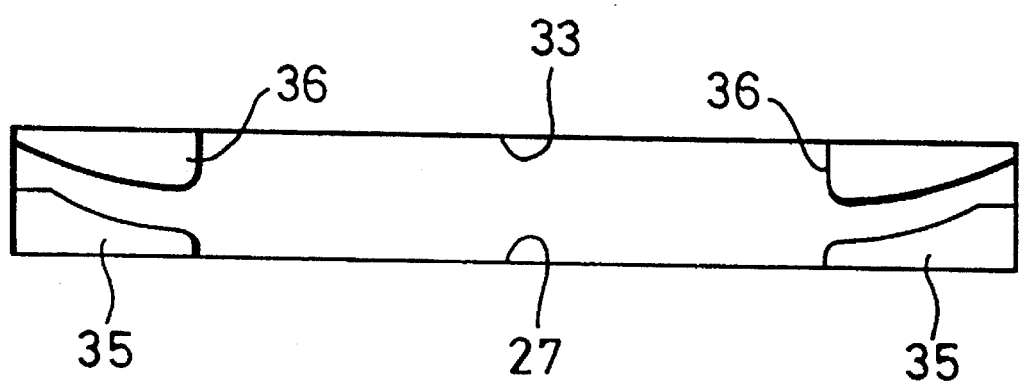

FIGS. 7 and 8 illustrate other preferred embodiments, in which the form of the ridges in the passageway are varied. As observed through the passage mouth 20, the embodiment illustrated in FIG. 7 has a pair of stepped concave portions 35 formed on the lower face 27 of a shutter plate for contact with the emulsion surface 2a. In FIG. 8, the ridges 32 on the upper face 33 are replaced with a pair of stepped convex portions 36. These also regulate the width-wise curling characteristic of the photographic film 2 as it is exited from the cassette. In other respects, these embodiments are similar to the embodiment described above.

Figure 9:
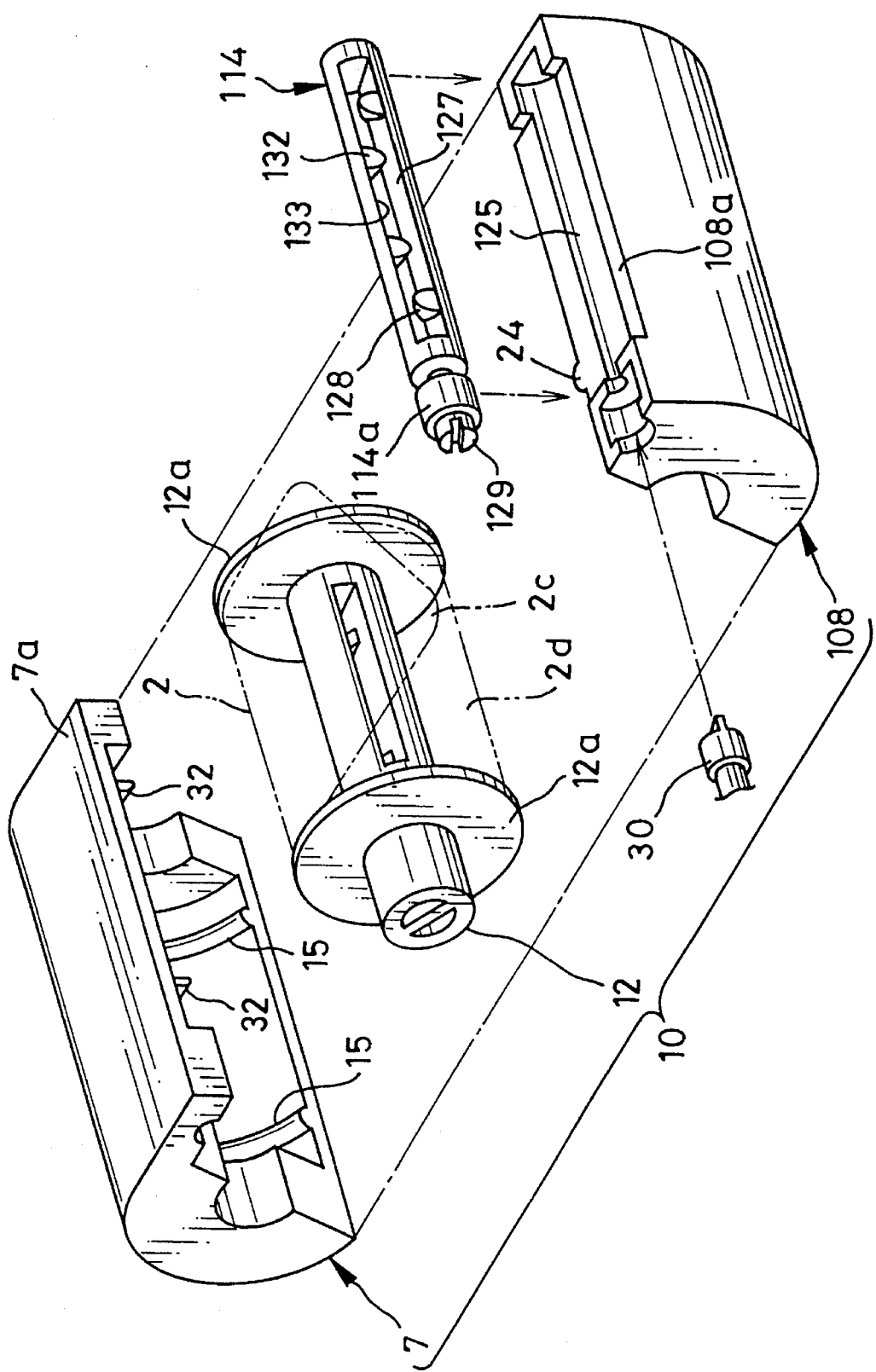
FIG. 9 is an exploded perspective view illustrating a photographic film cassette having a moveable shutter rod.
Figure 10:
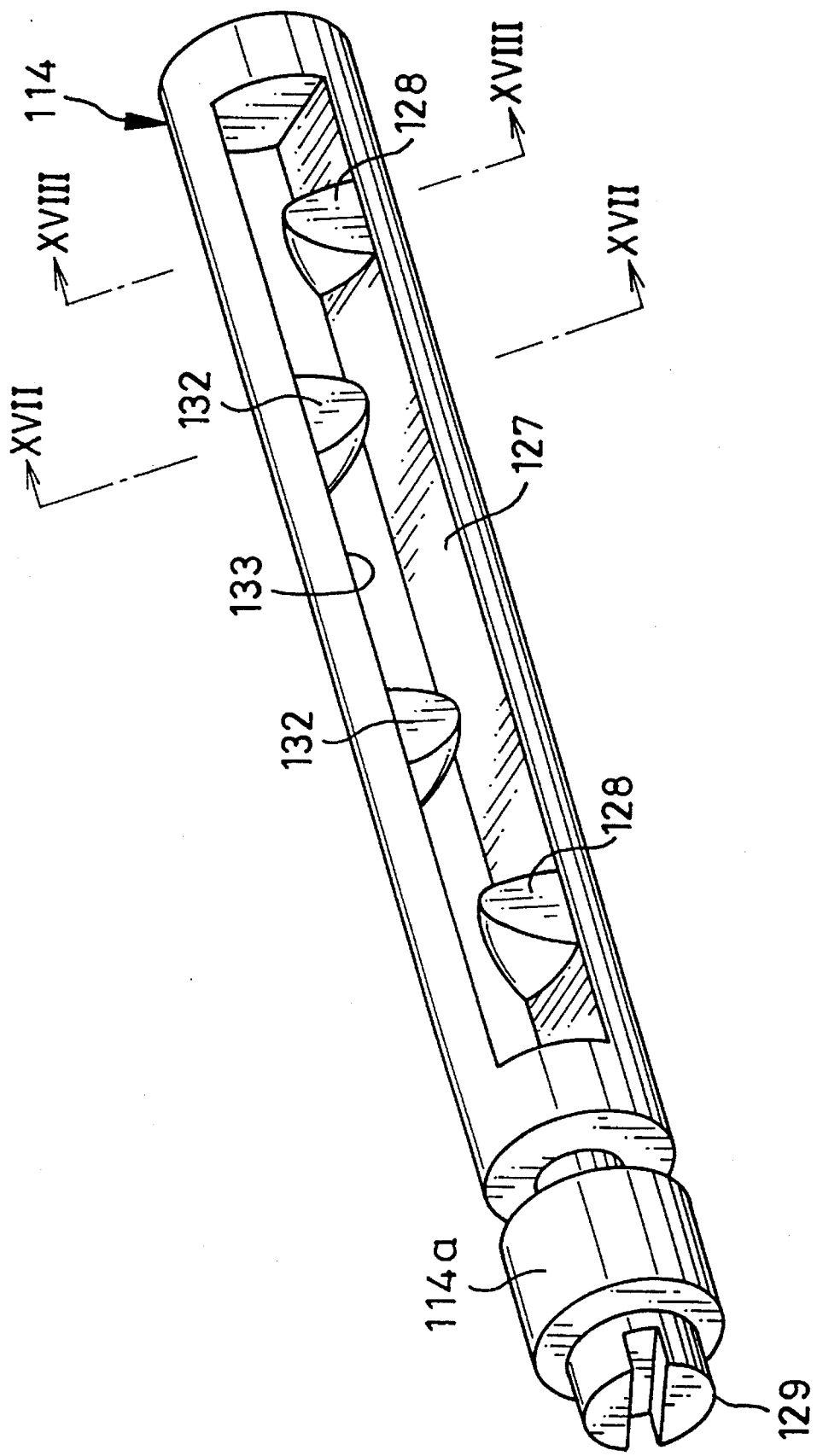
FIG. 10 is a perspective view illustrating the shutter rod.

FIGS. 9 and 10 illustrate a further preferred embodiment having a shutter rod 114 instead of the shutter plate. Elements similar to the above embodiments are designated with identical reference numerals. The shutter rod 114 has a slot formed therein for allowing the photographic film 2 to pass therethrough. The slot is defined by lower and upper walls 127 and 133, respectively. Ridges 128 are formed on the lower wall 127 to contact the emulsion surface 2a. Ridges 132 are formed on the upper wall 133 to contact the back surface 2b. In FIGS. 9 and 10, the slot is depicted somewhat larger than it actually may be, for convenience in understanding.

Figure 11:
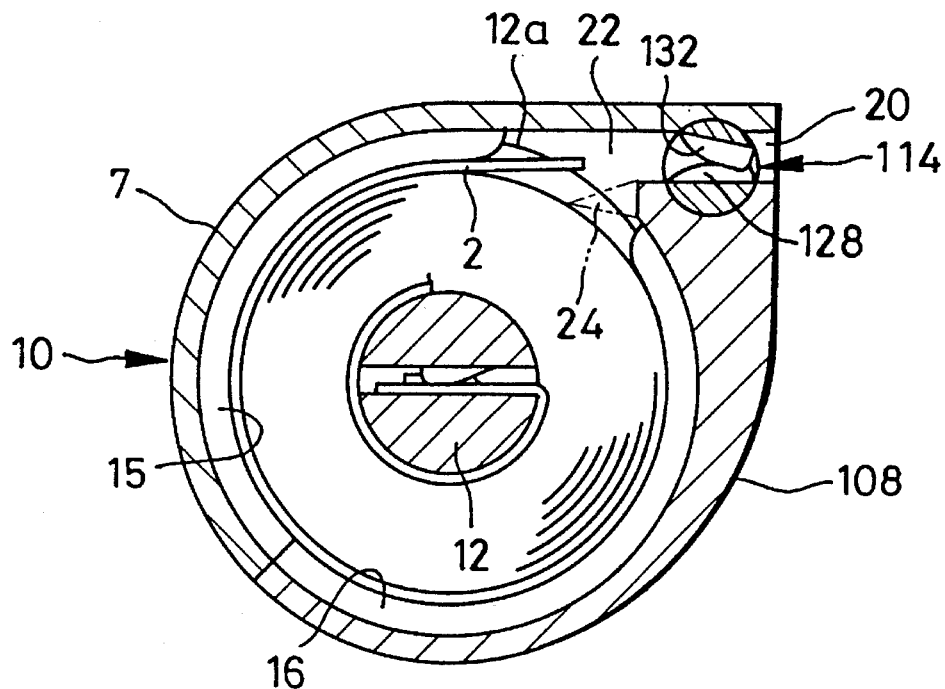
FIG. 11 is a sectional view illustrating the cassette in which a shutter rod is closed.
Figure 12:
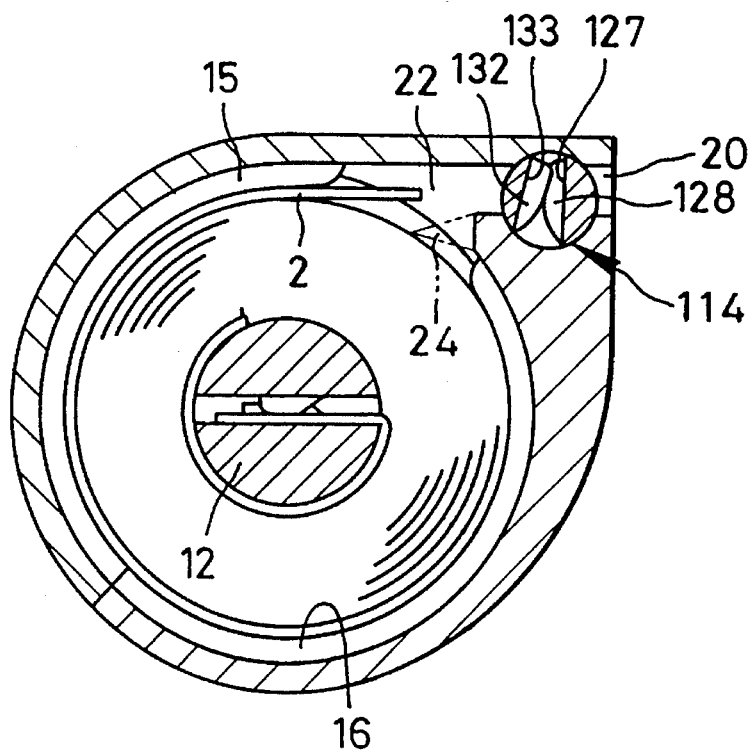
FIG. 12 is a sectional view illustrating the cassette in which the shutter rod is opened.
Figure 13:
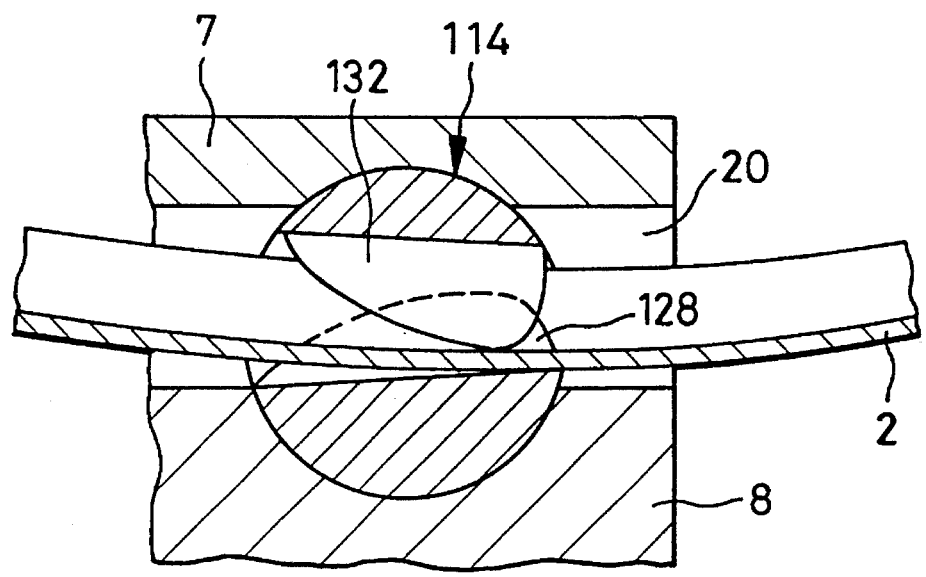
FIG. 13 is a plan view illustrating a passage mouth with photographic film passing therethrough.

When the shutter rod 114 is in an open position (wherein the slot provides communication between the passageway 22 and the passage mouth 20), the photographic film 2 can be passed through the shutter rod 114, (see FIG. 11). When the shutter rod 114 is in a closed position (wherein the mouth 20 is blocked from the passageway 2), the photographic film 2 is contained and protected from ambient light by the walls 127 and 133 (see FIG. 12). The shutter rod 114 is rotated by an opener mechanism 30 incorporated in a camera. When the photographic film 2 is passed through the shutter rod 114, the ridges 128 and 132, as illustrated in FIG. 13, effectively curl the photographic film 2 to make the emulsion surface 2a somewhat convex, i.e., curled in the direction opposite to original curling tendency of the photographic film 2.

Figure 24:
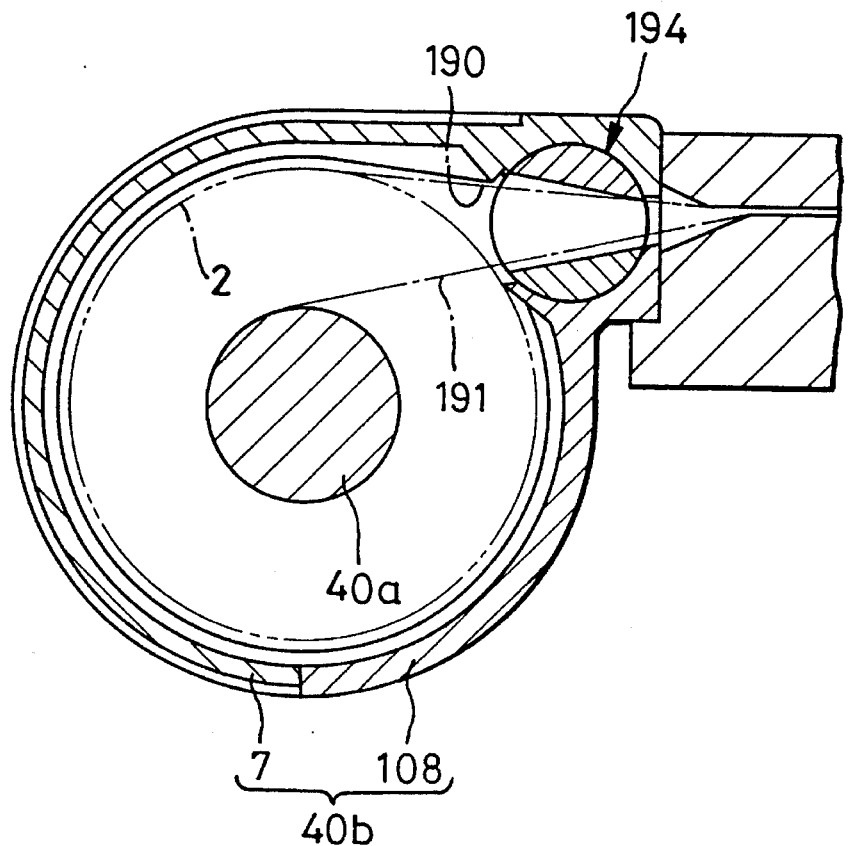
FIG. 24 is a cross sectional view illustrating a conventional photographic film cassette.

A comparative example or conventional device, is shown in FIG. 24. Such a cassette has a shutter rod 194 which does not include the ridges 128 and 132. When the photographic film 2 is initially advanced out of the cassette shell 40b loaded in a camera, the leader 2c of the photographic film 2 is moved substantially along a path line 190 tangential to the outermost turn of the roll 2d and a receiving gate 20 defined in the camera. When most of the photographic film 2 has been advanced out of the cassette, the roll 2d is smaller and the photographic film is moved substantially along a path line 191 which is tangential to the core of a spool 40a and the receiving gate 200 in the camera.

Because the slot inside the shutter rod 194 lacks any ridges, the photographic film 2 would be scratched by virtue of sliding contact with the inside of the slot, upon passage through the shutter rod 194. To protect the photographic film 2 from scratches, it would be necessary to design the cassette to cause the first and second path lines to intersect one another at a position which is inside the shutter rod 194, where the first path line is a path of the photographic film 2 extending from the roll 2d to the passageway when the roll 2d is largest, and the second path line is a path of the photographic film 2 extending from the spool 40a to the passageway when the roll 2d is smallest.

Figure 14:
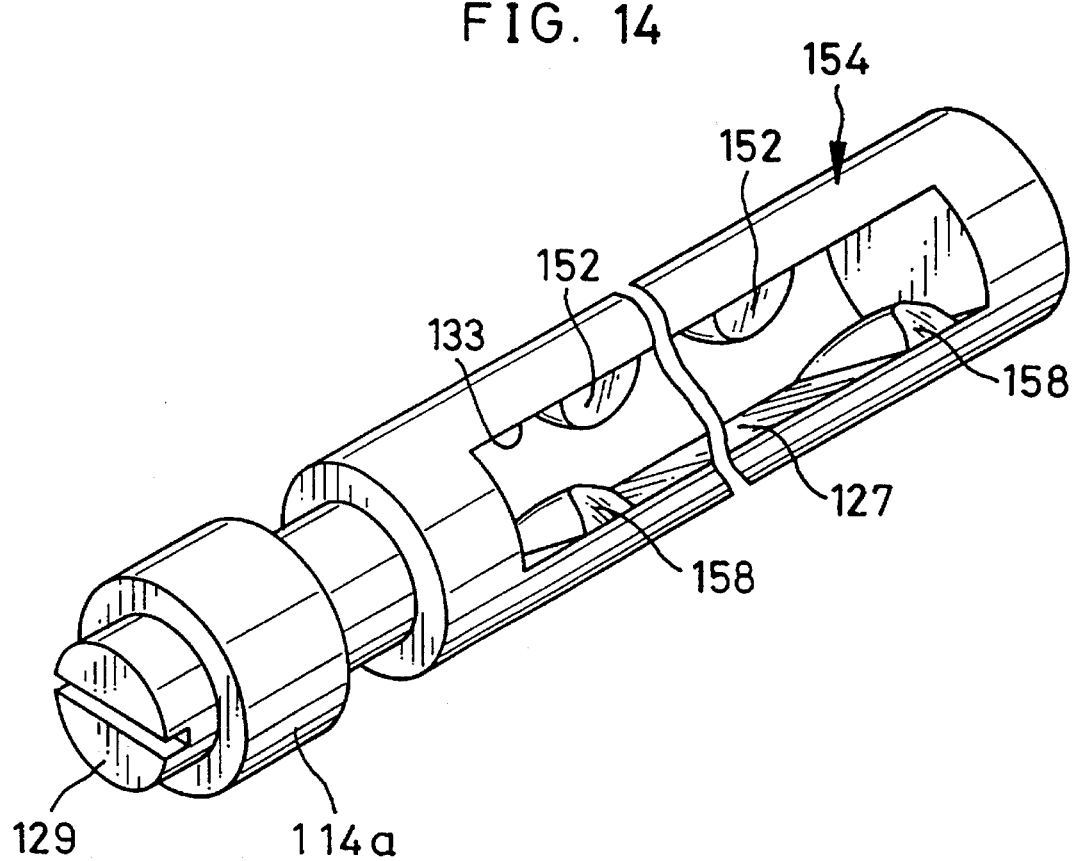
FIG. 14 is a perspective view illustrating a shutter rod of another preferred embodiment.
Figure 16:
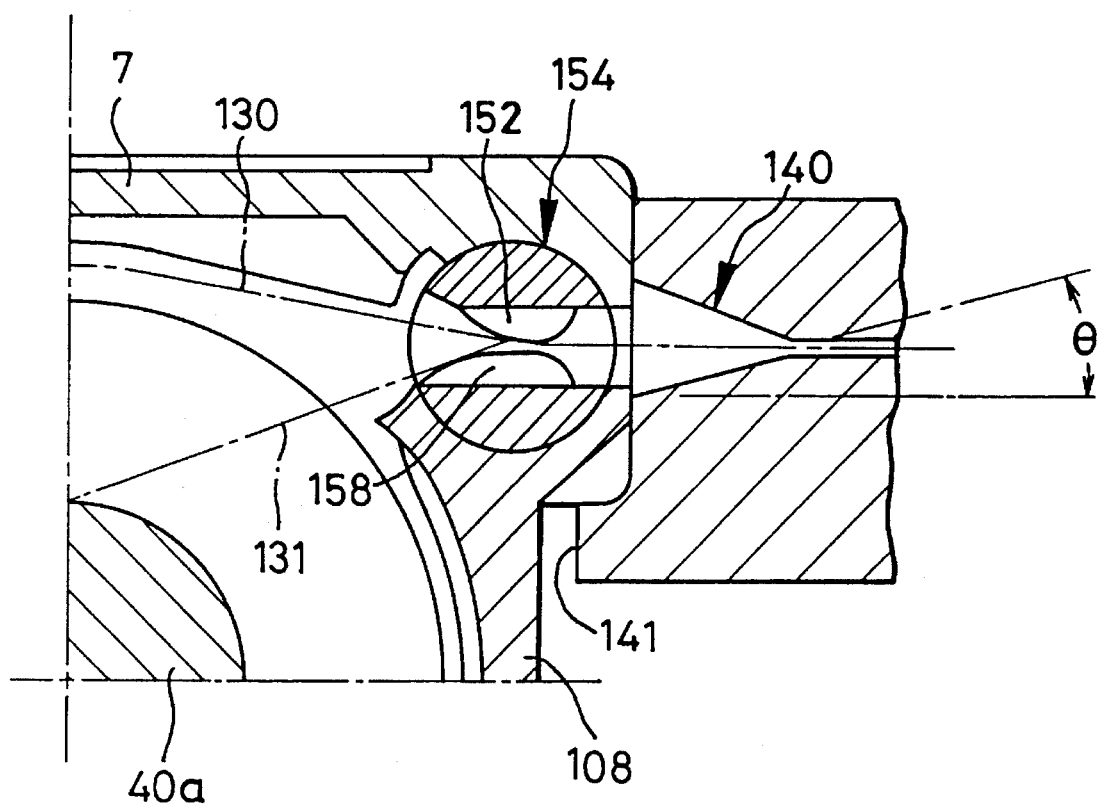
FIG. 16 illustrates the cassette with the shutter rod in FIG. 14, loaded in a suitable camera.

In view of the problems discussed above, another preferred embodiment utilizes a novel shutter rod 154 as illustrated in FIGS. 14 and 16. The shutter rod 154 is provided with pairs of ridges 152 and 158, unlike the shutter rod 194 in FIG. 24. Path lines 130 and 131 are caused to intersect at a position inside the shutter rod 154, because the path lines 130 and 131 are tangential to surfaces of the ridges 152 and 158. Note that the shutter rod 154 is similar to the shutter rod 114 in FIGS. 9 to 13, but different in that the opposite ridges 152 and 158 are formed so that a clearance, defined between the upper ridges 152 and the lower ridges 158, with respect to the direction of the thickness of the photographic film 2, is greater zero.

This allows a receiving gate 140 of a camera to open to a cassette chamber 141, to be easily formed (see FIG. 16). In particular, because the shutter rod 154 causes the leader 2c to pass through the passage mouth 20 while being position regulated in the direction across the thickness of the photographic film 2, a front wall of the receiving gate 140 can be formed so that an angle θ of walls opening toward the cassette is less steep, namely 30 degrees or below, in order to receive the leader 2c while avoiding contact with the film 2.

Figure 15:
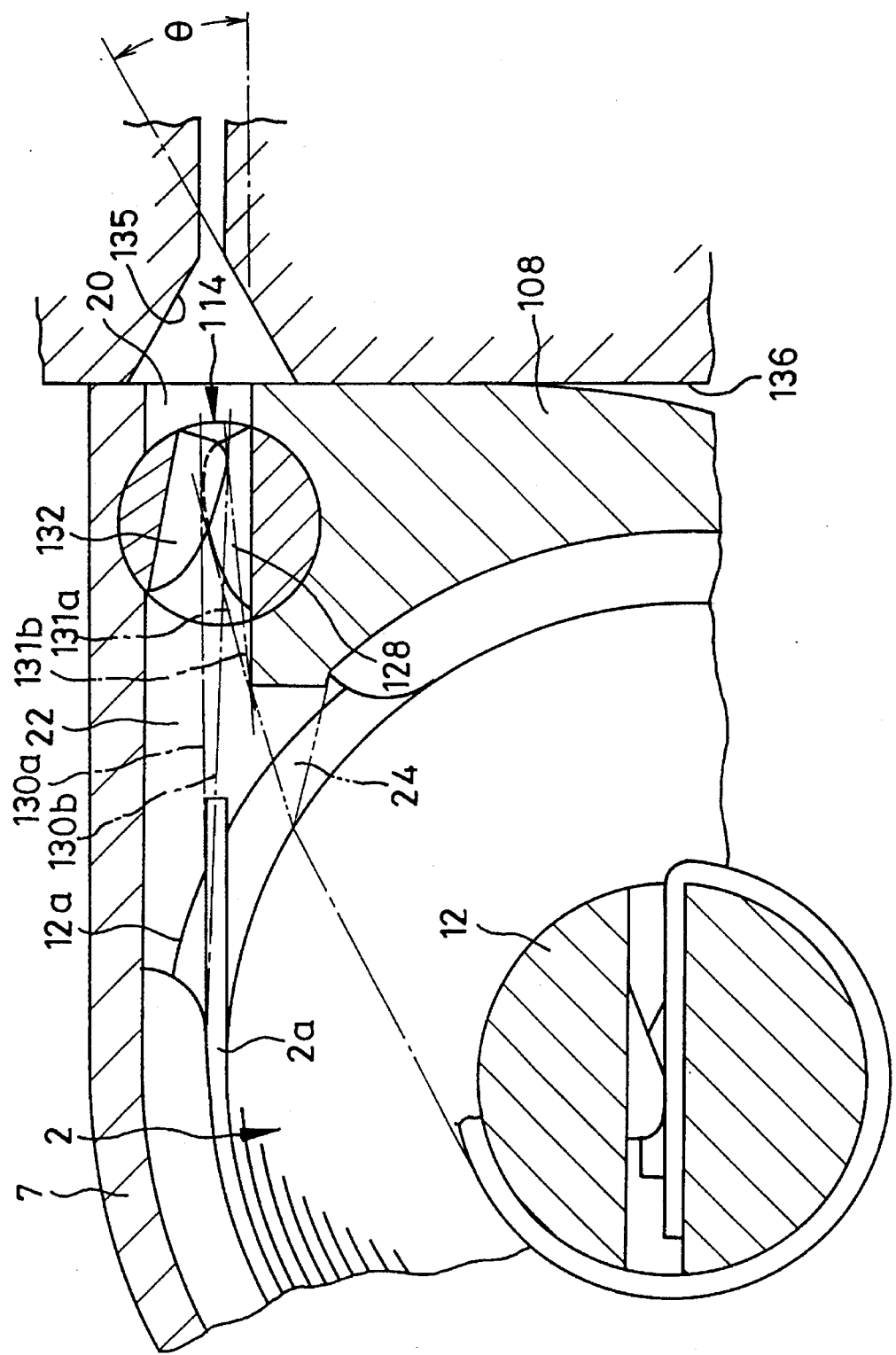
FIG. 15 illustrates the cassette in FIGS. 9 to 13, loaded in a suitable camera.

FIG. 15 illustrates the shutter rod 114 depicted in FIGS. 8 to 13, providing the same operation as in FIG. 14. A path line 130a, of the photographic film 2 of when the roll 2d is largest and tangential to the ridge 128, intersects a path line 131a, of the photographic film 2 of when the roll 2d is smallest and tangential to the ridge 128, within the shutter rod 114. A path line 130b of the photographic film 2, of when the roll 2d is largest and tangential to the ridge 132, intersects a path line 131b, of the photographic film 2 of when the roll 2d is smallest and tangential to the ridge 132, within the shutter rod 14. An associated gate 135, open to a cassette chamber 136, can be easily formed because a front wall of the receiving gate 135 can be formed so that an opening angle θ is less steep, namely 30 degrees or below while still avoiding contact with the film 2.

Figure 17:
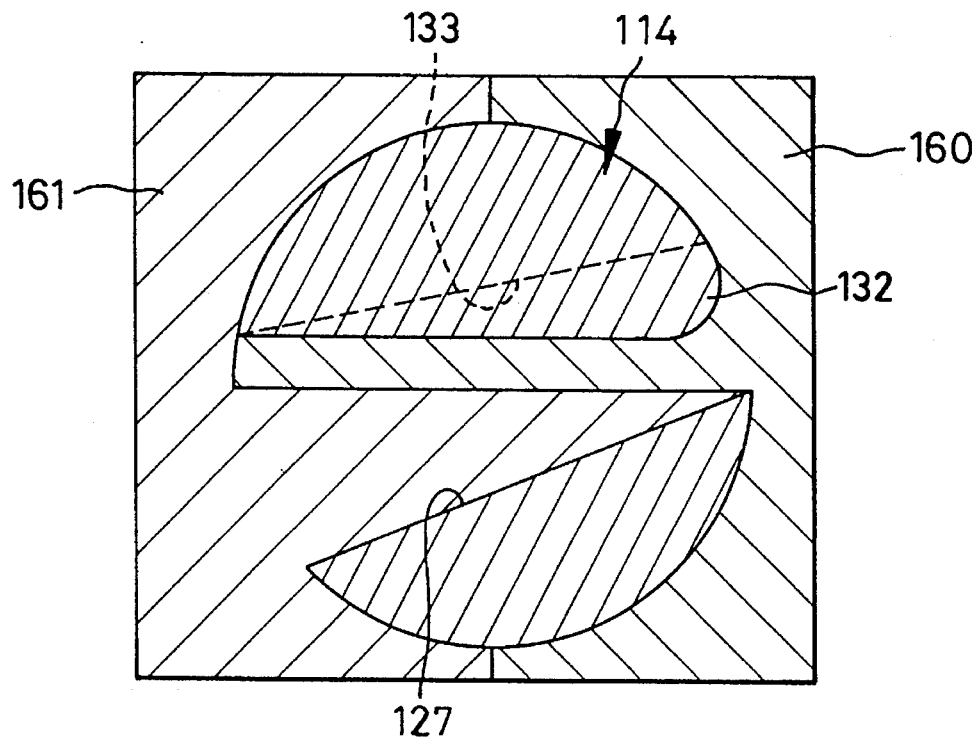
FIG. 17 is a sectional view illustrating the shutter rod in FIGS. 9 to 13 while molded with a pair of molds, as viewed on Line XVII—XVII in FIG. 10.
Figure 18:
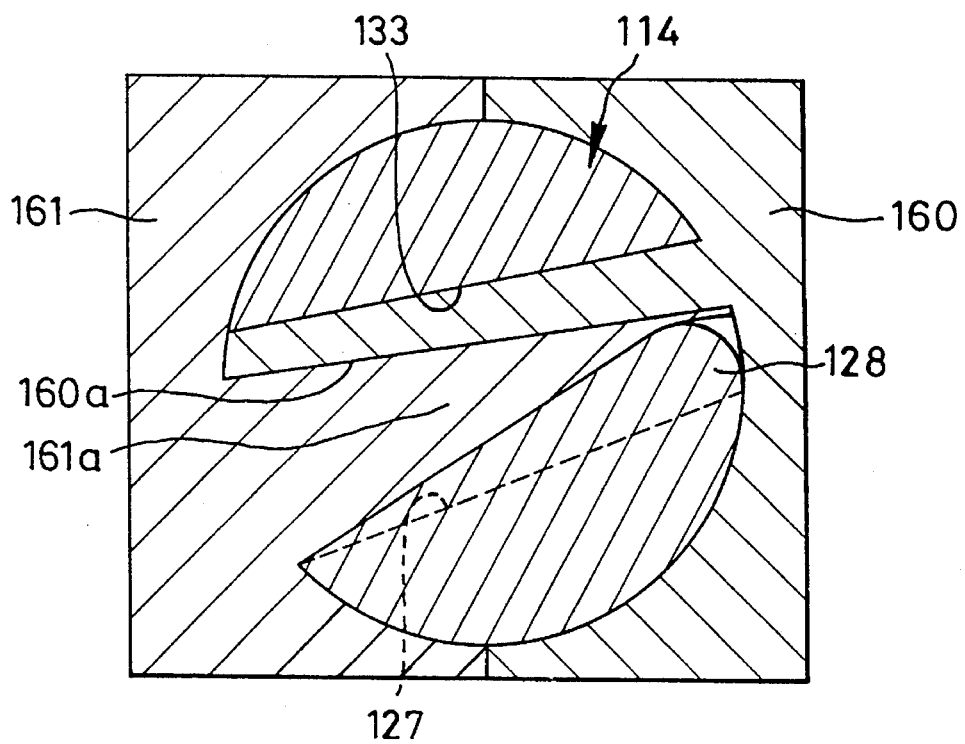
FIG. 18 is a sectional view illustrating the shutter rod in FIGS. 9 to 13 while molded with the molds, as viewed on Line XVIII—XVIII in FIG. 10.
Figure 19:
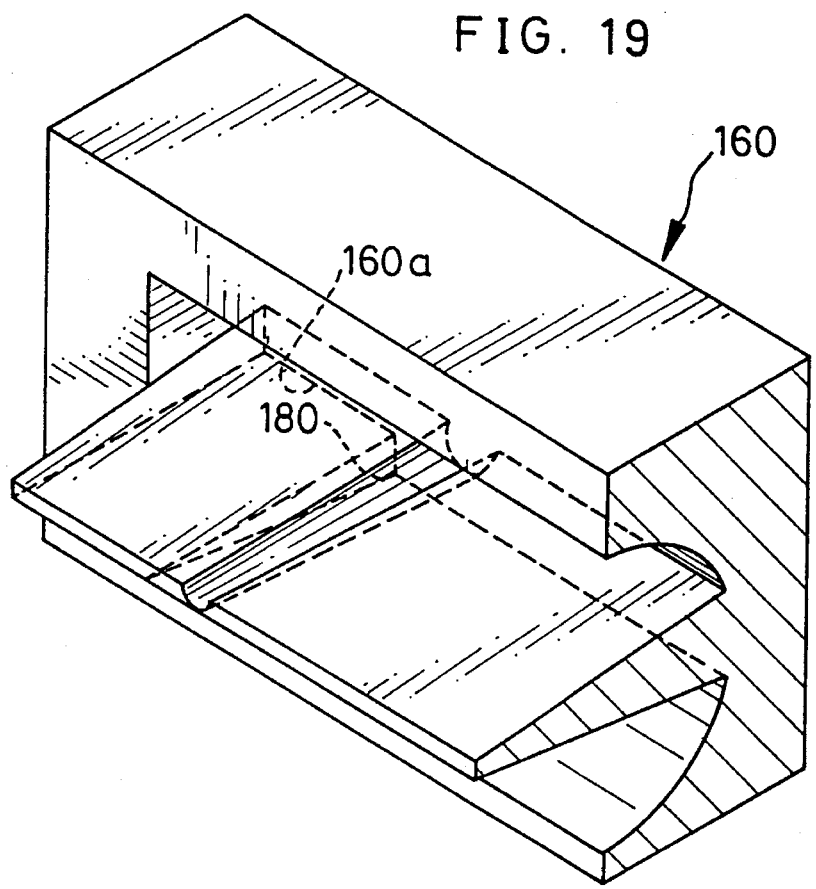
FIG. 19 is an exploded view illustrating the cavity-side mold.
Figure 20:
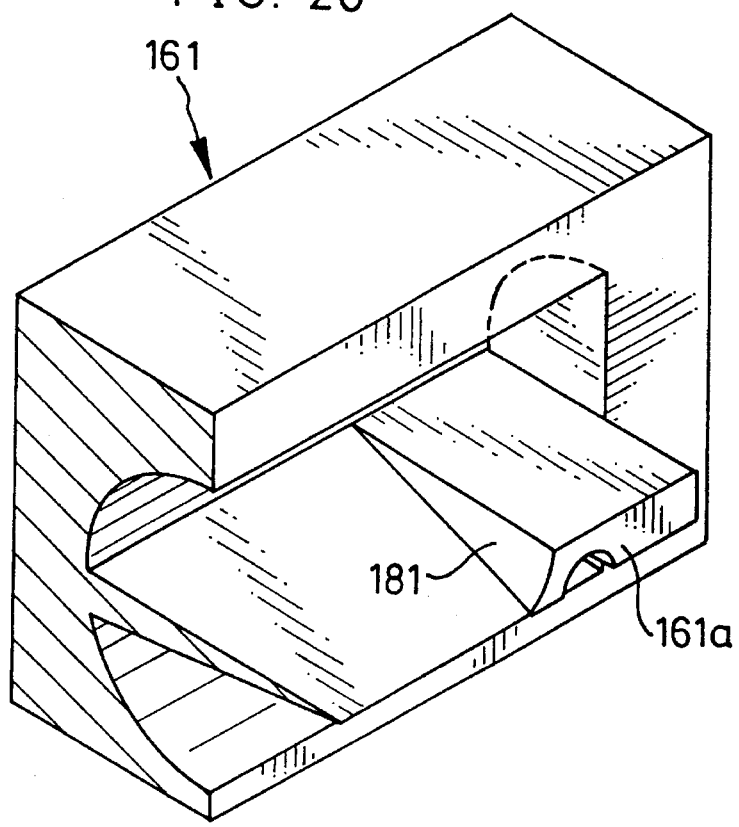
FIG. 20 is an exploded view illustrating the core-side mold.

FIGS. 17 to 20 illustrate a cavity-side mold 160 and a core-side mold 161, which are used for forming the shutter rod 114 with the ridges 128 and 132. Parting lines between the molds 160 and 161 are determined not at midway portions of the ridges 128 and 132, but at portions where the ridges 128 and 132 end at the round surface of the cylindrical core of the shutter rod 114. Accordingly, the parting lines, and thus any burrs or roughness associated therewith, avoid the path of the photographic film 2 as it passes through the shutter rod 114. Accordingly, the photographic film 2 is protected from scratches, as it does not come into contact with any burrs or roughness formed by the parting lines on the shutter rod 114. In other words, the upper wall 133 having the ridges 132 is formed solely by the mold 160 and the lower wall 127 having the ridges 128 is formed solely by the mold 161. Note that the shutter rod 114 is depicted in FIG. 17 in cross section along a line through the upper ridges 132, and is depicted in FIG. 18 in cross section along a line through the lower ridges 128.

The slot in the shutter rod 114 has a negative clearance, i.e., the upper ridges 132 project toward the lower wall 127 beyond the tops of the lower ridges 128. In other words, the lower ridges 128 and upper ridges 132 are overlapped in the direction of the thickness of the photographic film 2. Despite the negative clearance, the slot with the ridges can be formed by simple use of the two molds 160 and 161. The positions of the ridges 128 and 132 satisfy the relationship B<A, as illustrated in FIG. 4. The mold 160 is provided with a step 180, on which a step 181 on the mold 161 is fitted. This construction, the combination of the steps 180 and 181 with a portion 161a inserted in a recess 160a allows the opposite ridges 128 and 132 to be easily formed with the negative clearance. Even if a burr or roughness is formed at the parting lines, it is positioned remotely from the path or contact surface of the film. It would be conventional to use a slide core in addition to two molds for molding a shutter rod. The preferred embodiment, however, does not require a slide core and thus can be easily molded of a low cast.

Figure 21:
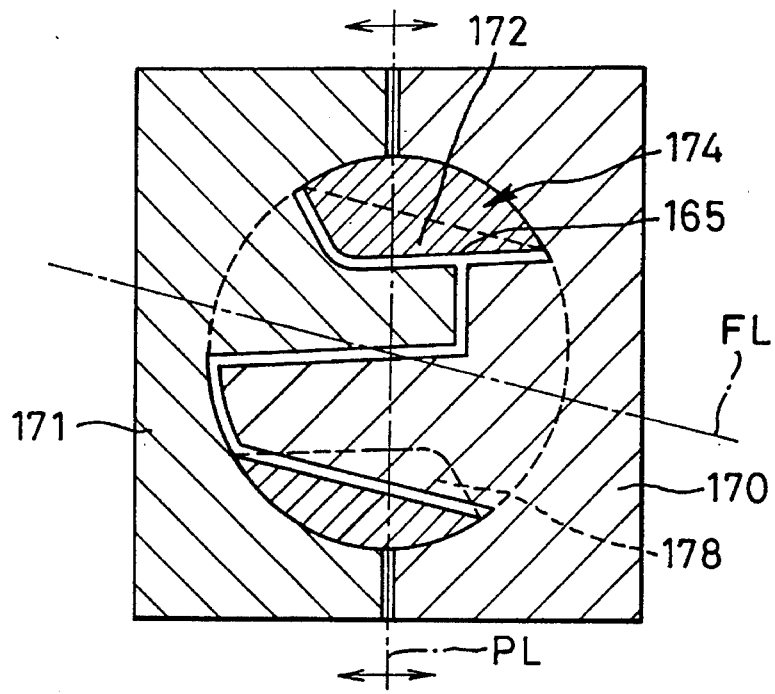
FIGS. 21A and 21B are sectional views illustrating a shutter rod while molded with other preferred molds, the former taken on a line across the upper ridge and the latter taken on a line across the lower ridge.
Figure 21:
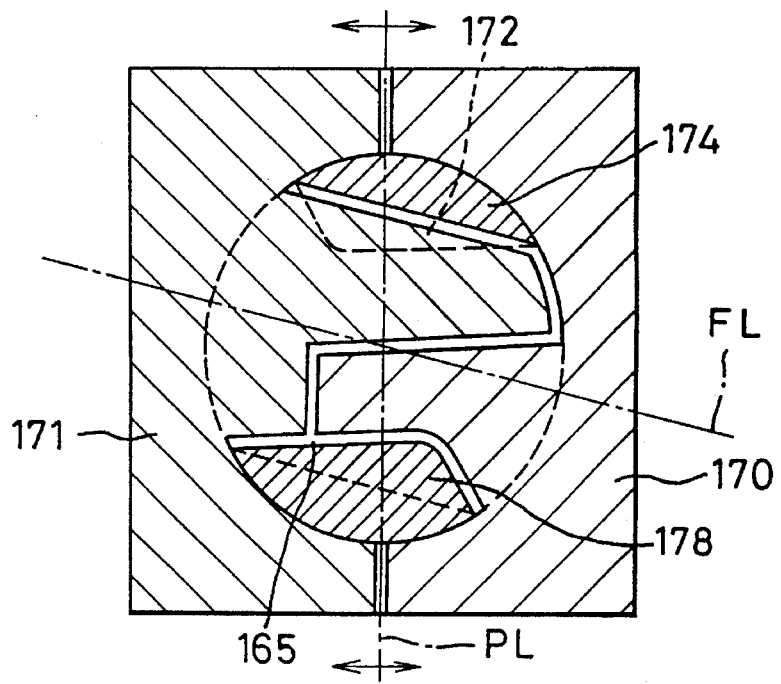

Parting lines between two molds, as illustrated in FIGS. 21A and 21B, can be such that they are located near, but deviated from, the contact surface of ridges in a slot to avoid direct abutment of the photographic film 2 on any burrs, or the like. Molds 170 and 171, for forming a shutter rod 174, have parting lines 165 which are defined, not on the tops of, but on inclined portions of ridges 172 and 178, for the purpose of preventing scratches from being formed on the photographic film 2 due to burrs formed at parting lines of a mold.

Figure 22:
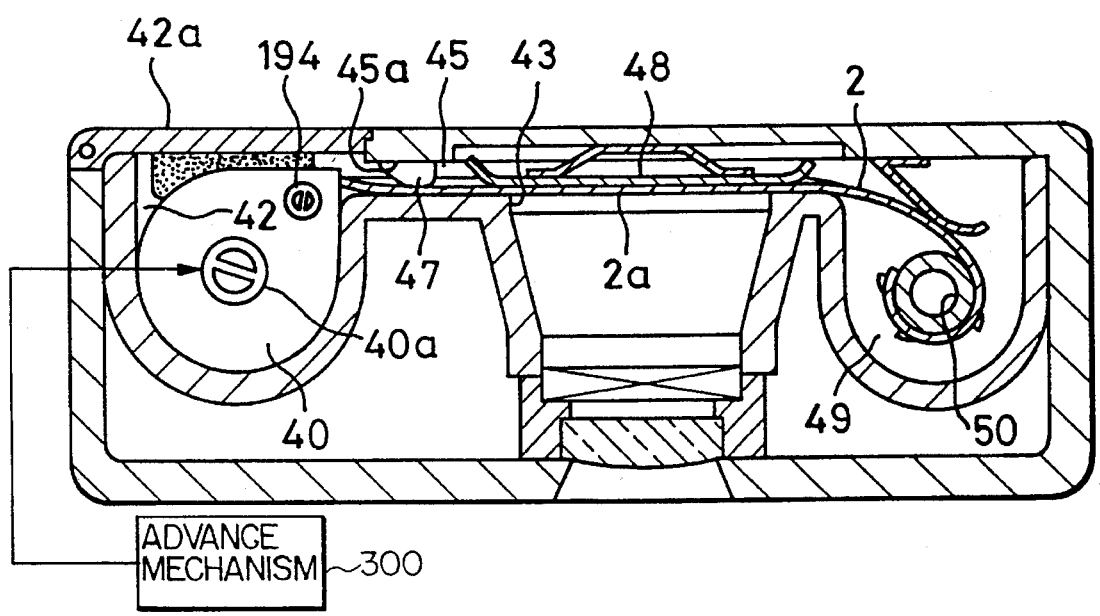
FIG. 22 is a horizontal sectional view illustrating a camera according to a preferred embodiment.
Figure 23:
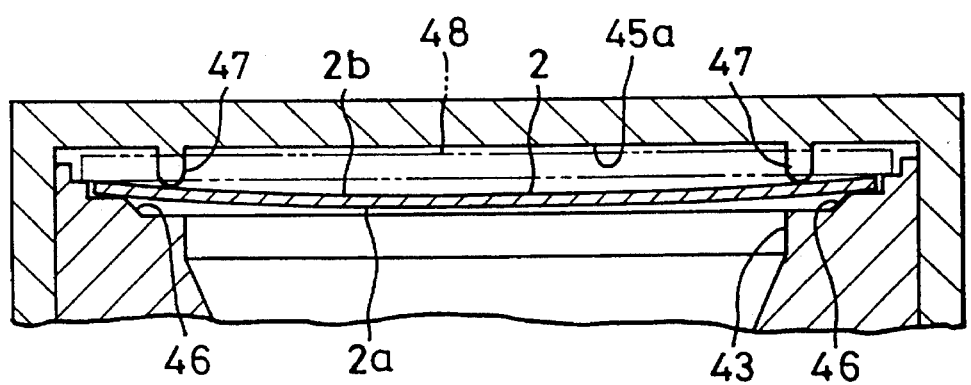
FIG. 23 is a cross sectional view illustrating view illustrating a gate for receiving the photographic film.

FIGS. 22 and 23 illustrate a preferred embodiment of a camera incorporating a curl-regulating structure which functions in a manner similar to the cassettes of the preferred embodiments discussed above. Elements similar to the above embodiments are designated with identical reference numerals. A photographic film cassette 40 is of a conventional type for use with the camera, of the preferred embodiment, and is inserted into a cassette chamber 42 of the camera. An exposure aperture 43 defines image frame areas to be exposed on the photographic film 2.

A photographic film path 45, of which a receiving gate 45a is open to the cassette chamber 42, is defined behind the exposure aperture 43. Although the cassette 40 does not have any structure for regulating the curling characteristic of the photographic film 2, the receiving gate 45a is constructed to regulate the curling characteristic of the photographic film 2. In particular, a front wall of the receiving gate 45a, facing the emulsion surface 2a, of film 2 is provided with a pair of stepped portions 46 to support the lengthwise edge of the photographic film 2. A back wall of the gate 45a, facing the back surface 2b is provided with a pair of ridges 47 to press the photographic film 2 at positions inside the stepped portions 46, but outside of the exposure-designated image areas defined on the photographic film 2.

In operation, a back lid 42a of the cassette chamber 42 is closed by the photographer. A rotatable shutter structure 194 of the cassette 40 is then rotated by the opener mechanism 30 of the camera, to place the shutter structure in an open position wherein a passageway of the cassette 40 is open. The spool 40a is then rotated in the direction of unwinding the photographic film 2 by an advance mechanism 300 of the camera. The leader 2c is then advanced through the passage mouth 20, and received into the gate 45a of the camera. Although the photographic film 2 originally has a tendency to curl to make the back surface 2a convex, advancement of the photographic film 2 between the stepped portions 46 and the ridges 47 regulates the widthwise curling characteristic of the photographic film 2, in the manner illustrated in FIG. 23. Note that the advance mechanism 300 is illustrated in a schematic manner. However, the advance mechanism 300 can be a motor coupled to the spool 40a in a known manner.

Successive rotation of the spool 40a advances the leader 2c through the path 45 in front of a pressure plate 48, and into a take-up chamber 49 of the camera. The leader 2c is taken up on a take-up spool 50, which is then driven to draw the photographic film 2 until a first exposure-designated image area is positioned behind the exposure aperture 43. Accordingly, the curling tendency of the photographic film 2 is regulated upstream of the exposure aperture 43. Thus the back surface 2a of the photographic film 2 is prevented from being rubbed on the back wall of the path 45 or the pressure plate 48, and from being damaged. Although conventionally the pressure plate 48 serves to keep the photographic film 2 flat on the exposure aperture 43, the curl-regulating structure of the camera is helpful in reliably flattening the photographic film 2 on the exposure aperture 43.

EXAMPLE 2

Figure 25:
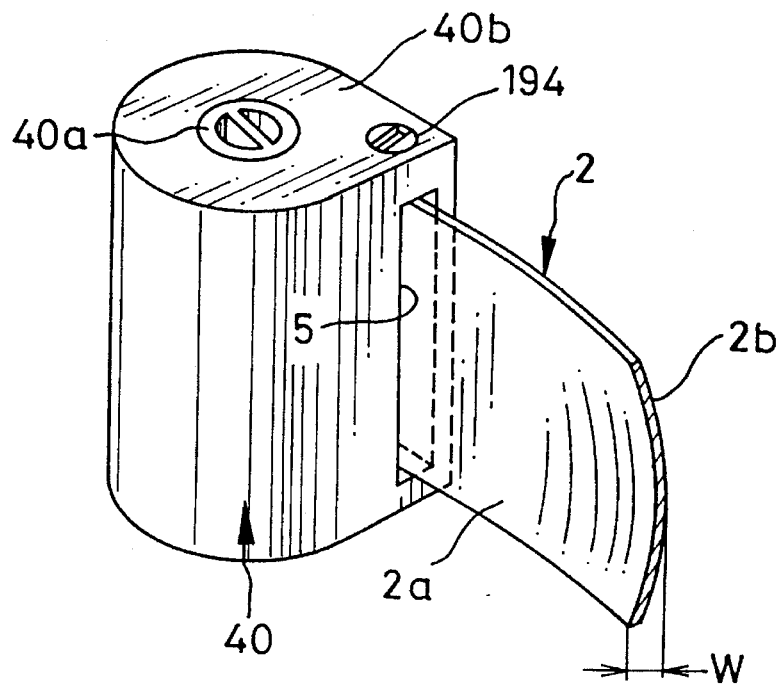
FIG. 25 is an exploded perspective view of the conventional cassette.

Samples 4 to 6 of the camera were produced for tests, while varying a clearance defined between the lower steps 46 and the upper ridges 47 with respect to the direction of the thickness of the photographic film 2. The photographic film 2 was passed through the receiving gate 45a of each example. The magnitude of curl of the film in the width-wise direction was observed, and the surfaces 2a and 2b were examined for damage. The photographic film 2 in use was SHG film (trade name) manufactured by Fuji Photo Film Co., Ltd. having AN ISO of 400. The photographic film 2, when in a free state, had a curling characteristic such that the width-wise middle of the photographic film 2 protruded from the lengthwise edges of the photographic film 2 to the amount of W (see FIG. 25) equal to 3.2 mm.

The photographic film 2 was of each example was measured for curling as the film 2 passed across the upstream side of the exposure aperture 43 through the path 45. A curling tendency of the photographic film 2 was regulated by the steps 46 and the upper ridges 47. The results are illustrated in the table below.

|  | Clearance (in mm) | Arch-Curled Amount (in mm) |
| --- | --- | --- |
| Sample 4 | 0.2 | 1.0 |
| Sample 5 | 0.0 | 0.4 |
| Sample 6 | −0.2 | 0.0 |

Sample 6 had a negative clearance, namely the ridges 47 were projected toward the front wall beyond the tops of the steps 46, in other words, the steps 46 and ridges 47 were overlapped in the direction of the thickness of the photographic film 2. Sample 6, in particular, completely removed the curling tendency of the photographic film 2. Note that the a novel camera having the curl-regulating structure can be used, not only with the conventional cassette 40, but also with the cassettes of the embodiments discussed above incorporating the curl-regulating structure.

Note that the ridges 28, 32, 128, 132, 152, 158, 172 and 178, and the steps 35 and 36 can be alternatively formed directly on the walls of the passageway 22, without use of a shutter plate or shutter rod. Also, ports 7a and 8a for the passageway 22 may be formed separately and attached to the cassette shell 10, and can be provided with the opposite ridges 28, 32, 128, 132, 152, 158, and the like. In the camera, the two walls of the receiving gate 45a may be a separate part which can be attachable to the photographic film path 45 in the camera, and which can be provided with the opposite steps 46 and 47.

As a resin for constructing the novel cassette, high-impact polystyrene (HIPS), styrene/butadiene block copolymer resin (SB), acrylonitrilebutadianestyrene resin (ABS), polycarbonate resin (PC), polypropylene resin (PP), polybutylene terephthalate (PBT), polyethylene terephthalate (PET), polyamide (PA), among others can be used and are desirable because of the mechanical strength of resulting products.

HIPS, SB, and PC are preferably used form molding the shell halves. Particularly, styrene type resin is preferable, such as HIPS and SB (e.g., ASAFLEX (trade name) manufactured by Asahi Chemical Industry Co., Ltd., CLEARENE (trade name) manufactured by Denka Co., and K-RESIN (trade name) manufacture by Philips Oil Co.). A mixture of SB and general-purpose polystyrene (GPPS) and a mixture of SB and HIPS is preferable as well. To impart the light-shielding characteristic to the shell halves, carbon black is added to the resin at 0.05–3.0 wt %. To improve the moldability and resistance to wear and abrasion in friction between resinous parts or between the resin and the photographic film, silicone oil is added to the resin at 0.5–3 wt %. It is also preferable to add carbon black at 0.3–1.5 wt %, and silicone oil at 1.0–2.5 wt %.

For molding the shutter plate or shutter rod, HIPS, SB, high-density polyethylene resin (HDPE) and PA can be used. HDPE and PA are advantageous because the resulting products exhibit a high resistance to wear and abrasion against the photographic film Deformation of crystalline resins, such as HDPE and PA, can cause the resulting cassette to exhibit unsatisfactory light shielding performance. To avoid this, the molds for molding the shutter members may be prepared with the deformation of resin taken into consideration, i.e., the shutter members may be preformed. SB in use may be mixed with GPPS, HIPS, or other resin compatible with SB. It is preferable to use mixture of SB with at least 30% of GPPS, or mixture of SB with at least 30% or HIPS.

For the shutter member, it is preferable to add carbon black and silicone oil, at amounts in the ranges similar to those for the shell halves, to the resin.

In consideration of disposal of waste after using the cassette, it is preferable to use the same styrene resin for all parts of the cassette, such as shell halves, the spool core, the spool flanges and the shutter member. Use of the same resin is favorable in remolding and regenerating the resin by crushing and pelleting empty cassettes collectively after removal of the exposed film. This serves to economize the use of natural resources.

Finally, control of the camera can be accomplished with known sensors coupled to a microprocessor based control device. Also, the various operational portions of the camera can be driven by known motors, solenoids, or the like.

Although the present invention has been fully described by way of the preferred embodiments thereof with reference to the accompanying drawings, various changes and modifications will be apparent to those having skill in this field without departing from the scope of the present invention, as defined by the appended claims.

What is claimed is:

1. A photographic film cassette including a cassette shell having a roll chamber defined therein, a spool contained in said roll chamber in a rotatable manner, and photographic film having an emulsion surface and a back surface and being wound on said spool in a form of a roll with said emulsion surface facing an inside of said roll, said photographic film having a leader which passes through a passage mouth defined in said cassette shell when said spool is rotated in an unwinding direction, said photographic film cassette comprising:

a passageway formed in said cassette shell to provide communication between said passage mouth and said roll chamber, said passageway being defined between opposite first and second inside faces, said first inside face being opposed to said emulsion surfaces of said photographic film, and said second inside face being opposed to said back surface of said photographic film when said photographic film passes through said passageway; and means for regulating a tendency of said photographic film to curl relative to a said width of said photographic film, said regulating means comprising:

a first pair of projections formed on said first inside face for coming in contact with said emulsion surface at a portion thereof which is outside of exposure-designated image areas relative to a width of said photographic film, said first pair of projections having concave faces defined thereon which are in contact with said photographic film when said photographic film is in said passageway; and a second pair of projections formed on said second inside face for coming in contact with sad back surface at a portion of said back surface which is outside of exposure-designated image areas relative to said width of said photographic film, said second pair of projections press said photographic film against said concave surfaces.

2. A photographic film cassette including a cassette shell having a roll chamber defined therein, a spool contained in said roll chamber in a rotatable manner, and photographic film having an emulsion surface and a back surface and being wound on said spool in a form of a roll with said emulsion surface facing an inside of said roll, said photographic film having a leader which passes through a passage mouth defined in said cassette shell when said spool is rotated in an unwinding direction, said photographic film cassette comprising:

a passageway formed in said cassette shell to provide communication between said passage mouth and said roll chamber, said passageway being defined between opposite first and second inside faces, said first inside face being opposed to said emulsion surfaces of said photographic film, and said second inside face being opposed to said back surface of said photographic film when said photographic film passes through said passageway; and means for regulating a tendency of said photographic film to curl relative to a said width of said photographic film, said regulating means comprising:

a first pair of projections formed on said first inside face for coming in contact with said emulsion surface at a portion of said back surface which is outside of exposure-designated image areas relative to a width of said photographic film, said first pair of projections having concave faces defined thereon which are in contact with said photographic film when said photographic film is in said passageway; and a second pair of projections formed on said second inside face for coming in contact with said back surface at a portion of said back surface which is outside of exposure-designated image areas relative to said width of said photographic film, said second pair of projections have convex faces which correspond to said concave faces.

3. A photographic film cassette including a cassette shell having a roll chamber defined therein, a spool contained in said roll chamber in a rotatable manner, and photographic film having an emulsion surface and a back surface and being wound on said spool in a form of a roll with said emulsion surface facing an inside of said roll, said photographic film having a leader which passes through a passage mouth defined in said cassette shell when said spool is rotated in an unwinding direction, said photographic film cassette comprising:

a passageway formed in said cassette shell to provide communication between said passage mouth and said roll chamber, said passageway being defined between opposite first and second inside faces, said first inside face being opposed to said emulsion surfaces of said photographic film, and said second inside face being opposed to said back surface of said photographic film when said photographic film passes through said passageway; and means for regulating a tendency of said photographic film to curl relative to a said width of said photographic film, said regulating means comprising:

a first pair of projections formed on said first inside face for coming in contact with said emulsion surface at a portion of said emulsion surface which is outside of exposure-designated image areas relative to a width of said photographic film; and a second pair of projections formed on said second inside face for coming in contact with sad back surface at a portion of said back surface which is outside of exposure-designated image areas relative to said width of said photographic film, wherein said second pair of projection come into contact with said photographic film at positions which are inward form said first pair of projections in a width-wise direction of said photographic film.

4. A photographic film cassette as defined in claim any one of claims 1–3, wherein said first and second pairs of projections are positioned to make said emulsion surface one of convex and flat in a width-wise direction of said photographic film.

5. A photographic film cassette as defined in claim 3, wherein end surfaces of said first and second pairs of projections are inclined so that the height of said first and second projections increases in a direction toward said passage mouth from said roll chamber in order to guide said photographic film from said roll chamber to said passage mouth.

6. A photographic film cassette as defined in claim 3, further comprising:

a shutter disposed in said passageway for preventing ambient light from entering said roll chamber, said shutter being moveable between closed and open positions in said passageway, in said closed position, said shutter blocks said passageway to shield ambient light, and, in said open position, said shutter does not block said passageway to allow said photographic film to pass through said passageway.

7. A photographic film cassette as defined in claim 6, wherein first and second virtual lines intersect within dimensions of said shutter said first virtual line being defined by said photographic film extending from said roll toward said passageway while said cassette shell contains substantially all of said photographic film, and said second virtual line being defined by said photographic film extending from said spool toward said passageway while substantially all of said photographic film is out of said cassette shell.

8. A photographic film cassette as defined in claim 7, further comprising:

a separator claw extending from said first inside face into said roll chamber for separating said leader from said roll wound around said spool.

9. A photographic film cassette as defined in claim 8, wherein said shutter has a shaft formed at each end thereof said shaft being supported on said cassette shell, and at least one of said shafts extends through an aperture formed in said cassette shell to an exterior of said cassette shell.

10. A photographic film cassette as defined in claim 9, wherein said shutter is a plate constituting a portion of one of said first and second inside faces, when said shutter is in said open position, said first inside face is in opposition to said second inside face.

11. A photographic film cassette as defined in claim 10, wherein said plate constitutes a portion of said first inside face.

12. A photographic film cassette as defined in claim 9, wherein said shutter is a rod supported between said first and second shell halves in a rotatable manner, said rod having a slot formed therethrough which is defined by a pair of walls constituting portions of said first and second inside faces, when said rod is in said closed position, said walls block said passageway, and, when said rod is in said open position, said slot is aligned with said passageway.

13. A photographic film cassette as defined in claim 12, wherein said first and second pairs of projections are arranged so that $C \geq 0$, where C is a clearance defined between said first and second opposite pairs of projections with respect to a direction along a thickness of said photographic film as said photographic film passes through said passageway.

14. A photographic film cassette as defined in claim 12, wherein said second pair of projections project toward said first inside face beyond free ends of said first pair of projections in a direction along a thickness of said photographic film when said photographic film passes through said passageway.

15. A photographic film cassette as defined in claim 14, wherein end surfaces of said first and second pairs of projections are inclined so as to increase a height of said first and second pairs of projections in a direction toward said passage mouth from said roll chamber to guide said photographic film exiting from said roll chamber.

16. A method of producing a photographic film cassette, said film cassette including a cassette shell having a roll chamber defined therein, a spool contained in said roll chamber in a rotatable manner, and photographic film wound on said spool in a form of a roll, said photographic film having a leader which is passed through a passage mouth formed in said cassette shell when said spool is rotated in an unwinding direction, said photographic film cassette further comprising a passageway formed between said passage mouth and said roll chamber for allowing said photographic film to pass therethrough, said passageway being defined between opposite first and second inside faces, said cassette further including a shutter rod arranged in said passageway for preventing ambient light from entering said roll chamber, said shutter rod being supported in a rotatable manner between said first and second shell halves to be moveable between closed and open positions in said passageway, a slot being formed through said shutter rod and being defined by first and second opposite walls, when said shutter rod is in said closed position, said walls block said passageway to prevent ambient light from entering said roll chamber, and, when said shutter rod is in said open position, said slot is aligned with said passageway to allow said photographic film to pass through said passageway, a first pair of projections formed on said first wall for coming in contact with said photographic film and a second pair of projections formed on said second wall for coming in contact with said photographic film, said first and second pair of projections regulating a tendency of said photographic film to curl relative to said a width-wise direction of said photographic film due to engagement with said film, said method comprising the steps of:

providing a first single mold member; and forming said first wall having said first pair of projections with said first single mold member.

17. A photographic film cassette producing method as defined in claim 16, further comprising the steps of forming said second wall having said second pair of projections with a second single mold member.

18. A method as claimed in claim 16, wherein said first and second mold members are constructed to define a parting line therebetween which is remote from portions of the first and second pairs of projections which come into contact with the film.

19. A camera for use with a photographic film cassette including a spool contained in a cassette shell in a rotatable manner, and photographic film wound on said spool in the form of a roll, said photographic film having a leader which passes through a passage mouth formed in said cassette when said spool is rotated in an unwinding direction, said camera comprising:

a cassette chamber for containing said cassette shell;

means for rotating said spool, in said unwinding direction to cause said leader of said photographic film to pass through said passage mouth;

a receiving gate formed in said cassette chamber for receiving said photographic film after it has passed through said passage mouth, said receiving gate being defined by front and rear walls;

a first pair of projections formed on said front wall for coming in contact with said photographic film in an area thereof which is outside of exposure-designated image areas of said photographic film with respect to a width-wise direction of said photographic film; and a second pair of projections formed on said rear wall for coming in contact with said photographic film in an area thereof which is outside of exposure-designated image areas relative to said width-wise direction of said photographic film, in positions inward from said first pair of projections relative to said width-wise direction, said first and second pair of projections regulating a tendency of said photographic film to curl relative to said width-wise direction by virtue of engagement with said film.

20. A camera as defined in claim 19, wherein end surfaces of said second pair of projections are inclined so as to increase a height of said first pair of projections in a direction toward an inside of said receiving gate in order to guide said photographic film through said receiving gate.

21. A camera as defined in claim 20, wherein said passageway is provided with a shutter for preventing ambient light from entering said roll chamber, said shutter is displaceable between closed and open positions, when said shutter is in said closed position, said shutter blocks said passageway to prevent ambient light from entering said cassette shell, and, when said shutter is in said open position, said passageway is open to allow said photographic film to pass therethrough.

22. A camera as defined claim 21, wherein said front and rear walls define an angular interval therebetween which is less than or equal to 30 degrees.

23. A camera as defined in claim 21, further comprising:

a third pair of projections formed on said front wall for coming into contact with said photographic film at portions thereof which are outside of exposure designated image areas; and a fourth pair of projections formed on said rear wall for coming into contact with said photographic film at positions thereof which are outside of exposure designated image areas;

said fourth pair of projections being positions between said third pair of projections in a width-wise direction of said photographic film to regulate a curling tendency of said photographic film.

* * * * *